US012195002B2

(12) United States Patent
Lin

(10) Patent No.: US 12,195,002 B2
(45) Date of Patent: Jan. 14, 2025

(54) LANE CHANGE CONTROL METHOD, VEHICLE-MOUNTED DEVICE AND READABLE STORAGE MEDIUM

(71) Applicant: Mobile Drive Technology Co., Ltd., New Taipei (TW)

(72) Inventor: Huang-Min Lin, New Taipei (TW)

(73) Assignee: Mobile Drive Technology Co., Ltd., New Taipei (TW)

( * ) Notice: Subject to any disclaimer, the term of this patent is extended or adjusted under 35 U.S.C. 154(b) by 187 days.

(21) Appl. No.: 18/097,458

(22) Filed: Jan. 16, 2023

(65) Prior Publication Data

US 2024/0182035 A1   Jun. 6, 2024

(30) Foreign Application Priority Data

Dec. 2, 2022  (TW) .................................. 111146468

(51) Int. Cl.
*B60W 30/18*  (2012.01)
*B60W 30/095*  (2012.01)

(52) U.S. Cl.
CPC .. *B60W 30/18163* (2013.01); *B60W 30/0953* (2013.01); *B60W 30/0956* (2013.01); *B60W 2554/4041* (2020.02); *B60W 2554/80* (2020.02)

(58) Field of Classification Search
CPC ....... B60W 30/18163; B60W 30/0953; B60W 30/0956; B60W 2554/4041; B60W 2554/80

USPC .......................................................... 701/41
See application file for complete search history.

(56) References Cited

U.S. PATENT DOCUMENTS

| | | | |
|---|---|---|---|
| 2011/0010094 A1* | 1/2011 | Simon .................... | G08G 1/167 701/301 |
| 2013/0226407 A1* | 8/2013 | Rentschler ............ | B60W 30/09 701/41 |
| 2014/0244105 A1* | 8/2014 | Dariush ................ | B60W 40/04 701/1 |
| 2017/0088136 A1* | 3/2017 | Seo ........................ | B60W 30/16 |
| 2018/0061253 A1* | 3/2018 | Hyun .................... | G08G 1/0175 |
| 2018/0201272 A1* | 7/2018 | Takeda .................. | B60W 10/20 |
| 2019/0329779 A1* | 10/2019 | D'sa ...................... | G06N 20/20 |
| 2020/0172106 A1* | 6/2020 | O'Dea ............ | B60W 30/18163 |
| 2022/0017077 A1* | 1/2022 | Seshadri ............... | G01S 13/931 |
| 2022/0126874 A1* | 4/2022 | Oh ................ | B60W 60/00274 |
| 2022/0324484 A1* | 10/2022 | Hruschka .......... | B60W 30/0956 |

\* cited by examiner

*Primary Examiner* — Phutthiwat Wongwian
*Assistant Examiner* — Brian R Kirby
(74) *Attorney, Agent, or Firm* — ScienBiziP, P.C.

(57) ABSTRACT

A lane change control method applied to a vehicle-mounted device is provided. The method includes calculating a first risk factor of a preceding vehicle based on a first vehicle data and a second vehicle data, calculating a second risk factor of an adjacent preceding vehicle based on the first vehicle data and a third vehicle data. A risk weight is obtained according to the first risk factor and the second risk factor. A lane-change weight is calculated based on a target lane line. A collective weight is obtained according to the lane-change weight and the risk weight. Once a plurality of reference vehicle values is obtained, the host vehicle is controlled to change lanes based on the plurality of reference vehicle values, the lane-change weight, and the first vehicle data.

20 Claims, 3 Drawing Sheets

LANE CHANGE CONTROL METHOD, VEHICLE-MOUNTED DEVICE AND READABLE STORAGE MEDIUM

FIELD

The present disclosure relates to vehicle control technology, in particular to a lane change control method, a vehicle-mounted device, and a readable storage medium.

BACKGROUND

In a current lane change control scheme for a vehicle, a problem of unsafe or unusual maneuver is often caused by an inability to fully consider an influence of other vehicles on the vehicle that is changing lane change.

DETAILED DESCRIPTION

In order to make the purpose, technical solution and advantages of the disclosure clearer, the disclosure will be described in detail below in conjunction with the accompanying drawings and detailed embodiments.

Figure 5:
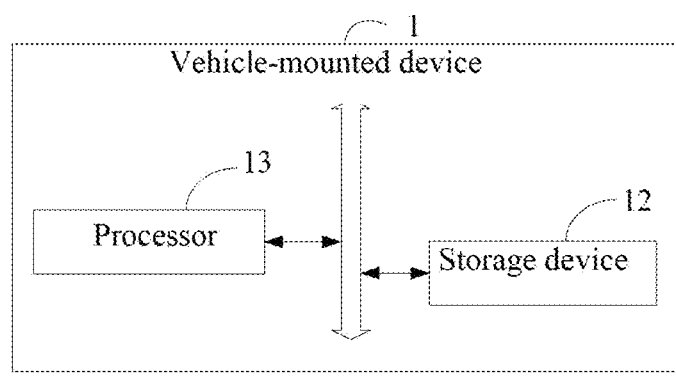
FIG. 5 is a schematic structural diagram of a vehicle-mounted device provided by an embodiment of the present disclosure.

The disclosed lane change control method can be applied to one or more vehicle-mounted devices, for example, a vehicle-mounted device 1 as shown in FIG. 5. The vehicle-mounted device may be a device/an instrument with an operating system configured in a vehicle (hereinafter "host vehicle"), or the vehicle-mounted device may be one or more computer devices, such as a smart phone, Laptop, etc., that communicate with a device configured in the vehicle.

The vehicle-mounted device is a device that can automatically perform calculation of a parameter value and/or processing information according to pre-set or stored instructions, and its hardware includes, but is not limited to: a microprocessor, an application specific integrated circuit (ASIC), a field-programmable gate array (FPGA), a digital signal processor (DSP), an embedded device, etc. The vehicle-mounted device 1 can also be any computer product capable of performing man-machine interaction with a user, such as a personal computer, a tablet computer, a smart phone, a personal digital assistant (PDA), a game console, an internet protocol television (IPTV), wearable smart devices, etc.

The vehicle-mounted device can also be connected to a network device to obtain or calculate relevant data from a cloud, so as to reduce a data calculation loss at a local end. Wherein, the network device includes, but is not limited to, a single network server, a server group composed of multiple network servers, or a cloud composed of a large number of hosts or network servers based on Cloud Computing.

Figure 1:
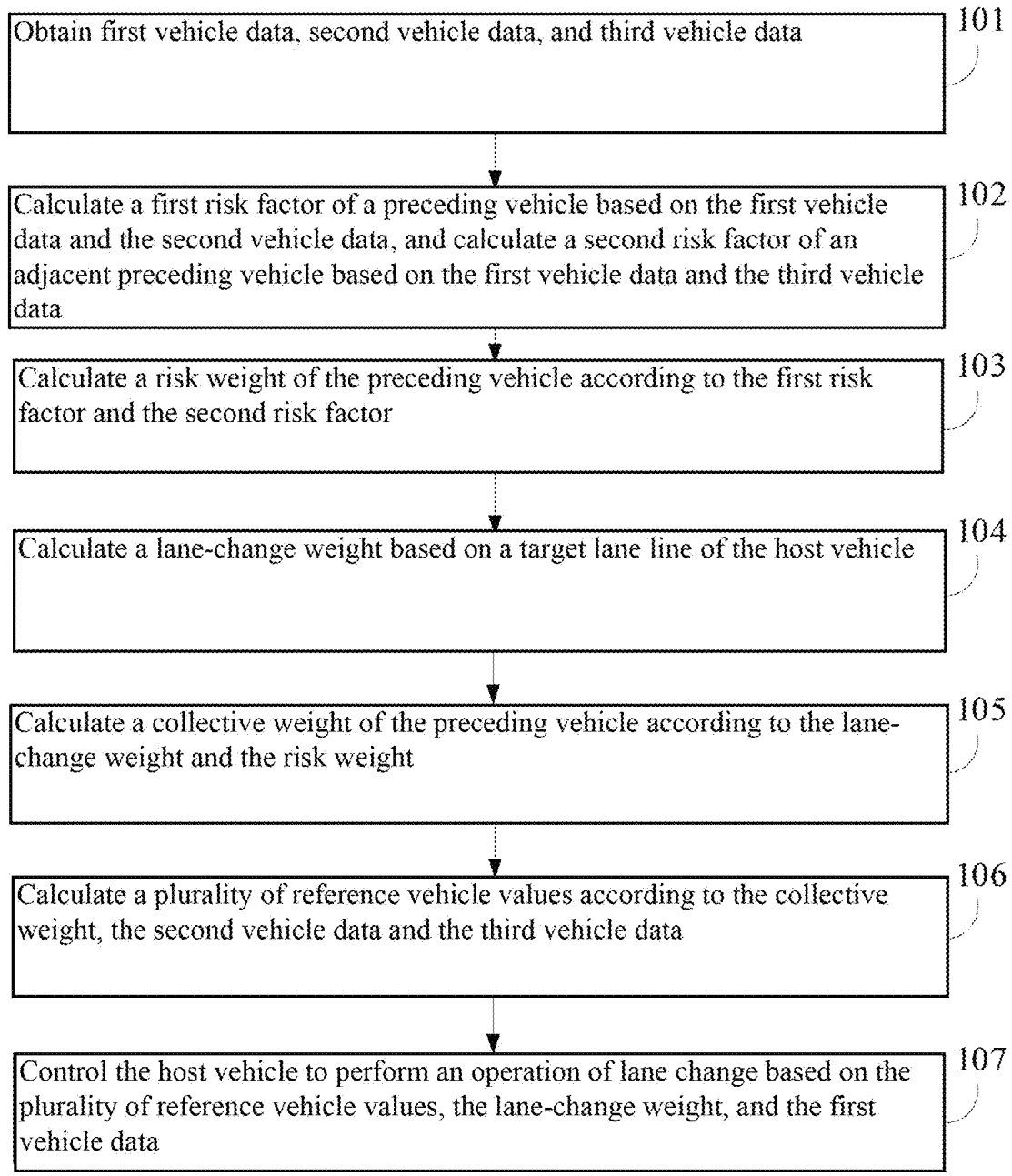
FIG. 1 is a flowchart of a lane change control method provided by an embodiment of the present disclosure.
Figure 2:
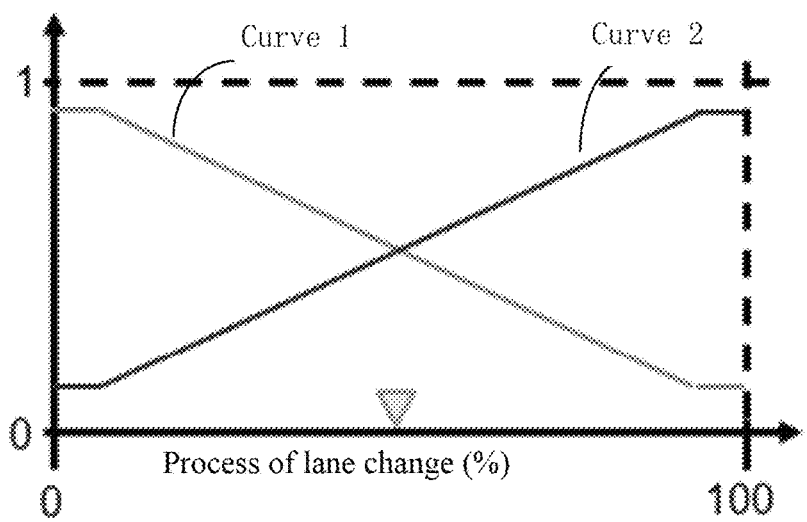
FIG. 2 is a schematic diagram of a first curve of collective weight and a first curve of adjacent weight provided by an embodiment of the present disclosure.

The network where the vehicle-mounted device is located includes, but is not limited to: the Internet, a wide area network, a metropolitan area network, an area network, a virtual private network (VPN) and the like. As shown in FIG. 1, it is a flowchart of a lane change control method provided by an embodiment of the present disclosure. According to different requirements, an order of each block in the flowchart can be adjusted according to actual detection requirements, and some blocks can be omitted. An execution subject of the lane change control method shown in FIG. 2 is the vehicle-mounted device.

Block 101, the vehicle-mounted device obtains first vehicle data, second vehicle data, and third vehicle data.

In at least one embodiment of the present disclosure, the first vehicle data is data of the host vehicle, and the first vehicle data includes, but is not limited to: a velocity of the host vehicle, an acceleration of the host vehicle, and a position of the host vehicle, etc. The second vehicle data is data of a vehicle ahead the host vehicle which is in a same lane of the host vehicle (hereinafter "preceding vehicle"). The second vehicle data includes, but is not limited to, a velocity of the preceding vehicle, an acceleration of the preceding vehicle, and a position of the preceding vehicle, and so on. The third vehicle data is data of a vehicle ahead the host vehicle which is in an adjacent lane of the host vehicle (hereinafter "adjacent preceding vehicle"). The third vehicle data includes, but is not limited to: a velocity of the adjacent preceding vehicle, an acceleration of the adjacent preceding vehicle, and a position of the adjacent preceding vehicle, etc.

In at least one embodiment of the present disclosure, the method further includes: the vehicle-mounted device acquires external vehicle data of a plurality of external vehicles, wherein each external vehicle data includes a position of each external vehicle. Each of the plurality of external vehicles is a vehicle different the host vehicle. According to the position of the host vehicle in the first vehicle data and the position of each of the plurality of external vehicles, the vehicle-mounted device identifies vehicles from the plurality of external vehicles that are in the same lane as the host vehicle as first target vehicles, and identifies vehicles from the plurality of external vehicles that are in the adjacent lane as second target vehicles. The vehicle-mounted device determines a vehicle from the first target vehicles being located in front of the host vehicle and having a smallest distance from the host vehicle as the preceding vehicle. Furthermore, the vehicle-mounted device determines a vehicle from the second target vehicles being located in front of the host vehicle and having a smallest distance from the host vehicle as a first adjacent vehicle, and determines a vehicle from the second target vehicles being located in front of the first adjacent vehicle and having a smallest distance from the first adjacent vehicle as a second adjacent vehicle. Further, the vehicle-mounted device calculates a first time of collision (hereinafter "first collision time") between the host vehicle and the first adjacent vehicle, and when the first collision time is less than a first preset threshold value, the vehicle-mounted device determines the second adjacent vehicle as the adjacent preceding vehicle, and when the first collision time is greater than or equal to the first preset threshold value, the vehicle-mounted device determines the first adjacent vehicle as the adjacent preceding vehicle.

Wherein, the first preset threshold value can be set according to requirements, which is not limited in this disclosure.

For example, the first preset threshold value may be 5 seconds or 6 seconds and so on.

In at least one embodiment of the present disclosure, the vehicle-mounted device obtains a distance between the host vehicle and each external vehicle by calculating a longitudinal distance between the host vehicle and each external vehicle according to the position of the host vehicle and the position of each external vehicle.

In at least one embodiment of the present disclosure, a formula of calculating the first collision time is: $TTC_{rel}=-X_{rel}/V_{rel}$; wherein, $TTC_{rel}$ represents the first collision time, and $X_{rel}$ represents a distance between the host vehicle and the first adjacent vehicle, $V_{rel}$ represents a difference of velocity between the velocity of the host vehicle and the velocity of the first adjacent vehicle.

In this embodiment, since a distance between the second adjacent vehicle and the host vehicle is larger than a distance between the first adjacent vehicle and the host vehicle, when the first collision time between the host vehicle and the first adjacent vehicle is less than the first preset threshold value, the vehicle-mounted device determines the second adjacent vehicle as the adjacent preceding vehicle can avoid collisions caused by too small distance between vehicles, so that more time can be left for the host vehicle to adjust the velocity of the host vehicle, thereby avoiding discomfort caused by emergency lane changes, and improving the comfort of a user when the host vehicle changes lanes.

In some embodiments, further, the vehicle-mounted device calculates a first collision time between the host vehicle and the second adjacent vehicle (the method of calculating the first collision time between the host vehicle and the second adjacent vehicle is the same as the method of calculating the first collision time between the host vehicle and the first adjacent vehicle), and when the first collision time between the host vehicle and the second adjacent vehicle is less than the first preset threshold value, a vehicle located in front of the second adjacent vehicle and having a smallest distance from the second adjacent vehicle is determined as the adjacent preceding vehicle, or when the first collision time between the host vehicle and the second adjacent vehicle is greater than or equal to the first preset threshold value, the vehicle-mounted device determines the second adjacent vehicle as the adjacent preceding vehicle.

In other words, in some embodiments, the first collision time between the adjacent preceding vehicle currently determined and the host vehicle can be calculated, if the first collision time between the adjacent preceding vehicle currently determined and the host vehicle is greater than or equal to the first preset threshold value, the adjacent preceding vehicle will not be updated. If the first collision time between the adjacent preceding vehicle currently determined and the host vehicle is less than the first preset threshold value, a vehicle in front of the adjacent preceding vehicle having a smallest distance from the adjacent preceding vehicle currently determined is determined as an updated adjacent preceding vehicle, and repeat the above blocks.

In at least one embodiment of the present disclosure, the obtaining of the first vehicle data, the second vehicle data, and the third vehicle data includes: obtaining the first vehicle data from a local database of the host vehicle, and obtaining the external vehicle data of the plurality of external vehicles through sensors in the host vehicle; determining the external vehicle data of the preceding vehicle as the second vehicle data, and determining the external vehicle data of the adjacent preceding vehicle as the third vehicle data.

Wherein, the sensors include, but are not limited to: vehicle cameras, laser radars, millimeter wave radars, and the like.

Block 102, the vehicle-mounted device calculates a first risk factor of the preceding vehicle based on the first vehicle data and the second vehicle data, and calculates a second risk factor of the adjacent preceding vehicle based on the first vehicle data and the third vehicle data.

In at least one embodiment of the present disclosure, the first risk factor refers to factors that the preceding vehicle influences a lane change of the host vehicle, and the second risk factor refers to factors that the adjacent preceding vehicle influences a lane change of the host vehicle.

In at least one embodiment of the present disclosure, the calculating of the second risk factor of the adjacent preceding vehicle based on the first vehicle data and the third vehicle data includes: calculating a relative velocity between the host vehicle and the adjacent preceding vehicle according to the velocity of the host vehicle and the velocity of the adjacent preceding vehicle; calculating a second collision time according to a distance between the host vehicle and the adjacent preceding vehicle, and the relative velocity; and calculating the second risk factor based on the velocity of the host vehicle, the distance between the host vehicle and the adjacent preceding vehicle, the second collision time, and a second preset threshold value.

Wherein, the second preset threshold value can be set according to requirements, which is not limited in this disclosure. For example, the second preset threshold value may be 6 seconds.

Wherein, the method of calculating the relative velocity is basically the same as the method of calculating the difference of velocity, so this disclosure will not repeat them here. The method of calculating the second collision time is basically the same as the method of calculating the first collision time, so the present disclosure will not repeat them here.

Specifically, the formula of calculating the second risk factor is:

$$K_{crt\_next} = \sqrt{\left(\frac{e^{\frac{X_{err}}{X_{set}}}}{X_{rel}}\right)^2 - \text{sgn}(TTC_{rel}) * \left(\frac{1}{TTC_{rel}}\right)^2};$$

$K_{crt\_next}$ represents the second risk factor, $X_{set}$ represents a product of the second preset threshold value and the velocity of the host vehicle, $X_{rel}$ represents a distance between the host vehicle and the adjacent preceding vehicle, and $X_{err}$ represents a difference of distance between a distance of adjacent vehicles and a preset distance, $TTC_{rel}$ represents the second collision time, $\text{sgn}(TTC_{rel})$ represents a sign of the second collision time, wherein the distance of adjacent vehicles is a distance between the host vehicle and the adjacent preceding vehicle, the preset distance can be set according to the velocity of the host vehicle, which is not limited in this disclosure. For example, the preset distance equals 6 meters.

In this embodiment, the method of calculating the first risk factor is basically the same as the method of calculating the second risk factor, so this disclosure will not repeat them here.

Through the above implementation, when the first risk factor of the preceding vehicle and the second risk factor of the adjacent preceding vehicle are obtained, the influence of the preceding vehicle and the adjacent preceding vehicle on the lane change of the host vehicle can be initially determined.

Block 103, the vehicle-mounted device calculates a risk weight of the preceding vehicle according to the first risk factor and the second risk factor.

In at least one embodiment of the present disclosure, the calculating of the risk weight of the preceding vehicle according to the first risk factor and the second risk factor includes: obtaining a sum of factors by adding the first risk factor to the second risk factor; obtaining the risk weight by calculating a ratio of the first risk factor to the sum of factors.

In this embodiment, by calculating a proportion of the first risk factor in the sum of factors, the risk weight can be normalized so that an influence of the preceding vehicle and the adjacent preceding vehicle on the lane change of the host vehicle is more intuitive.

Block 104, the vehicle-mounted device calculates a lane-change weight based on a target lane line of the host vehicle.

In at least one embodiment of the present disclosure, the target lane line is related to an intention of lane change of the host vehicle, and when the intention of lane change of the host vehicle is to change lanes to a right side of the host vehicle, the target lane line is a right lane line closest to the host vehicle, and when the intention of lane change of the host vehicle is to change lanes to a left side of the host vehicle, the target lane line is a left lane line closest to the host vehicle.

In at least one embodiment of the present disclosure, the lane-change weight is a weight of the host vehicle when changing lanes, and the lane-change weight is inversely proportional to a process of lane change of the host vehicle. As the process of lane change progresses, a value of the lane-change weight becomes smaller and smaller.

For example, when a value range of the lane-change weight is [0,1], when the lane-change weight is 1, it means that the process of lane change of the host vehicle is 0 (the host vehicle has not started to change lanes), when the lane-change weight is 0, it means that the process of lane change of the host vehicle is 1 (the host vehicle has completed the lane change).

In at least one embodiment of the present disclosure, when the host vehicle changes lanes to the right side and the value range of the lane-change weight is [0,1], the calculating of the lane-change weight based on the target lane line of the host vehicle includes: obtaining offsets at a plurality of times, wherein an absolute value of each offset at each of the plurality of times is a lateral distance between the host vehicle and the target lane line at each of the plurality of times; comparing an offset at a first time to an offset at a second time, wherein the second time is later than the first time; when the offset at the first time is less than or equal to the offset at the second time offset, determining a value 1 as a target offset; when the offset at the first time is greater than the offset at the second time, determining a ratio of the offset at the second time to the offset at the first time as the target offset, and determining the target offset as the lane-change weight.

Wherein, when the target lane line is on the right side of the host vehicle, an initial value of the offset is set to be a negative value, and when the host vehicle completes the lane change, the offset is set be zero, for example, the lateral distance between the host vehicle and the target lane line is 5, and the initial value of the offset may be set to be −5. The first time is a time when the host vehicle starts to change lanes, and the second time is a time when the host vehicle changes lanes for a period of time. A time interval between the first time and the second time can be set according to requirements, which is not limited in this disclosure. It can be understood that, in order to know the lane change situation of the host vehicle in time, the time interval between the first time and the second time should be relatively small, for example, the time interval between the first time and the second time equals 1.5 seconds or 3 seconds.

In this embodiment, when the intention of lane change of the host vehicle is to change lanes to the right side of the host vehicle, there may be a situation that the host vehicle first drives to the left side of the host vehicle, it means that the host vehicle has not started to change lanes, that is, the lane-change weight is 1, so when the offset at the first time is less than or equal to the offset at the second time, the value 1 being directly used as the lane-change weight can reduce an amount of calculation.

In at least one embodiment of the present disclosure, the vehicle-mounted device calculates a third collision time between the host vehicle and a rear vehicle, when the host vehicle changes lanes to the right side and the value range of the lane-change weight is [0,1], and when the third collision time is less than a third preset threshold value, the calculating of the lane-change weight based on the target lane line of the host vehicle further includes: calculating a risk factor of the rear vehicle; obtaining offsets at a plurality of times, wherein each of the offsets at each of the plurality of times is a lateral distance between the host vehicle and the target lane line at each of the plurality of times; comparing an offset at a first time to an offset at a second time, wherein the second time is later than the first time; when the offset at the first time is greater than the offset at the second time (an absolute value of the offset at the first time is smaller than an absolute value of the offset at the second time), determining a value 1 as a target offset; when the offset at the first time is less than or equal to the offset at the second time (the absolute value of the offset at the first time is greater than the absolute value of the offset at the second time), determining a ratio of the offset at the second time to the offset at the first time as a target offset; obtaining a target weight by adding the target offset to the risk factor of the rear vehicle; comparing the target weight with the value 1, and selecting a smaller value between the target weight and the value 1 as the lane-change weight.

Wherein, the rear vehicle can be one of the plurality of external vehicles that is in the same lane as the host vehicle and has a smallest distance from the host vehicle relative to other external vehicles.

Specifically, the calculating of the risk factor of the rear vehicle includes: calculating a first difference value between the third collision time and the third preset threshold value; calculating a second difference value between the third preset threshold value and a fourth preset threshold value; calculating a ratio of the first difference value to the second difference value; and obtaining the risk factor of the rear vehicle by subtracting the ratio of the first difference value to the second difference value from the value 1.

Wherein, the method of calculating the third collision time is basically the same as the method of calculating the first collision time, so this disclosure will not repeat them here. The third preset threshold value is smaller than the fourth preset threshold value, and the third preset threshold value and the fourth preset threshold value can be set according to requirements which is not limited in this disclosure, for example, the third preset threshold value is 7 seconds, and the fourth preset threshold is 10 seconds.

In this embodiment, when the third collision time is less than the third preset threshold value, it means that the host vehicle may collide with the rear vehicle when the host vehicle changes lanes. The present disclosure considers the risk factor of the rear vehicle when the lane-change weight is calculated, so that the lane-change weight that has been added the risk factor of the rear vehicle includes more vehicle information, by adding the risk factor of rear vehicle to the lane-change weight, a reference vehicle value below is more accurate, therefore, the safety when the host vehicle changes lanes can be improved.

In at least one embodiment of the present disclosure, when the host vehicle changes lanes to the left side and the value range of the lane-change weight is [0,1], the calculating of the lane-change weight based on the target lane line of the host vehicle includes: obtaining offsets at a plurality of times, wherein each of the offsets is a lateral distance between the host vehicle and the target lane line; comparing the offset at a first time to the offset at a second time, wherein the second time is later than the first time; when the offset at the first time is greater than or equal to the offset at the second time offset, determining a ratio of the offset at the second time to the offset at the first time as a weight offset; when the offset at the first time is less than the offset at the second time, determining a value of 1 as the weight offset, and determining the weight offset as the lane-change weight.

In this embodiment, when the intention of lane change of the host vehicle is to change lanes to the left side of the host vehicle, there may be a situation that the host vehicle first travels to the right side of the host vehicle, and it means that the host vehicle has not started to change lanes, and the lane-change weight is 1, so when the offset at the first time is greater than or equal to the offset at the second time, the value 1 is directly used as the lane-change weight, which can reduce the amount of calculation.

In at least one embodiment of the present disclosure, when the host vehicle changes lanes to the left side and the value range of the lane-change weight is [0,1], and the third collision time is less than the third preset threshold value, the calculating of the lane-change weight based on the target lane line of the host vehicle further includes: obtaining an added weight by adding the risk factor of the rear vehicle to the weight offset; comparing the added weight with the value 1, and selecting a smaller value between the added weight and the value 1 as the lane-change weight.

In other embodiments of the present disclosure, when the value range of the lane-change weight is not [0,1], and the intention of lane change of the host vehicle is generated but the has not started changing lane, the vehicle-mounted device can determine other vehicles except the preceding vehicle and the rear vehicle in the same lane as the host vehicle as first concerned vehicles, and determine other vehicles except the adjacent preceding vehicle in the adjacent lane as second concerned vehicles, when the host vehicle changes lanes to the right side, and the offset at the first time is less than or equal to the offset at the second time, the vehicle-mounted device obtains a weight difference by calculating a difference between the value 1 and a first preset weight; determines the weight difference as the target offset; or when the host vehicle changes lanes to the left side, and the offset at the first time is greater than or equal to the offset at the second time, the vehicle-mounted device determines the weight difference as the weight offset; when the host vehicle has completed the lane change, the vehicle-mounted device determines a second preset weight as the lane-change weight. Therefore, the value range of the lane-change weight may be set as [the second preset weight, the weight difference].

Wherein, the first preset weight is related to the second concerned vehicle, the second preset weight is related to the first concerned vehicle, and the first preset weight and the second preset weights can be set according to requirements, which is not limited in this disclosure. A sum of the second preset weight and the weight difference is 1. For example, the first preset weight may be 0.2, the weight difference may be 0.8, and the second preset weight may be 0.2. Therefore, the value range of the lane-change weight is [0.2, 0.8].

Block 105, the vehicle-mounted device calculates a collective weight of the preceding vehicle according to the lane-change weight and the risk weight.

In at least one embodiment of the present disclosure, the vehicle-mounted device obtains the collective weight by calculating a product of the lane-change weight and the risk weight.

In this embodiment, since the risk weight is the risk weight of the preceding vehicle, the collective weight can represent the influence of the preceding vehicle when the host vehicle changes lanes.

Block 106, the vehicle-mounted device calculates a plurality of reference vehicle values according to the collective weight, the second vehicle data and the third vehicle data.

In at least one embodiment of the present disclosure, the plurality of reference vehicle values include, but are not limited to: reference vehicle velocity, reference vehicle acceleration, and reference vehicle distance.

In at least one embodiment of the present disclosure, the calculating of the plurality of reference vehicle values according to the collective weight, the second vehicle data and the third vehicle data includes: obtaining an adjacent weight of the adjacent preceding vehicle by calculating a difference between the value 1 and the collective weight; obtaining first multiplication result by calculating a product of the collective weight and the velocity of the preceding vehicle in the second vehicle data; obtaining second multiplication result by calculating a product of the adjacent weight and the velocity of the adjacent preceding vehicle in the third vehicle data; obtaining the reference vehicle velocity by calculating a sum of the first multiplication result and the second multiplication result. Further, the vehicle-mounted device calculates the reference vehicle acceleration according to the acceleration of the preceding vehicle in the second vehicle data, the acceleration of the adjacent preceding vehicle in the third vehicle data, the collective weight and the adjacent weight. Furthermore, the vehicle-mounted device calculates the reference vehicle distance according to a distance between the host vehicle and the preceding vehicle, a distance between the host vehicle and the adjacent preceding vehicle, the collective weight, and the adjacent weight. Wherein, the vehicle-mounted device calculates the distance between the host vehicle and the preceding vehicle according to the velocity of the preceding vehicle in the second vehicle data, and the velocity of the host vehicle. The vehicle-mounted device calculates the distance between the host vehicle and the adjacent preceding vehicle according to the velocity of the adjacent preceding vehicle in the third vehicle data and the velocity of the host vehicle.

Wherein, the methods of calculating the reference vehicle acceleration and the reference vehicle distance are basically the same as the method of calculating the reference vehicle velocity, so the present disclosure will not repeat them here.

In this embodiment, since the plurality of reference vehicle data is equivalent to the data generated after weighting the corresponding data in the second vehicle data and the third vehicle data based on the collective weight, due to the weighted calculation can characterize the degree of influence of the preceding vehicle and the adjacent preceding vehicle on the lane change of the host vehicle, so that the plurality of reference vehicle data can have higher accuracy.

For example, as shown in FIG. 2, it is a schematic diagram of a first curve of collective weight and a first curve of adjacent weight provided by the embodiment of the present disclosure. A realization scenario in FIG. 2 is that when the host vehicle changes lanes, the first risk factor of the preceding vehicle is the same as the second risk factor of the adjacent preceding vehicle. A horizontal axis in FIG. 2 represents a process of lane change, a vertical axis in FIG. 2 represents the collective weight and/or the adjacent weight, and a curve 1 in FIG. 2 is a curve of the collective weight, and a curve 2 is a curve of the adjacent weight, because the first risk factor is the same as the second risk factor, the first collision risk is the same as the second collision risk, wherein the first collision risk is a collision risk between the host vehicle and the preceding vehicle, so the second collision risk is a collision risk between the host vehicle and the adjacent preceding vehicle, so the collective weight changes linearly with the adjacent weight.

Figure 3:
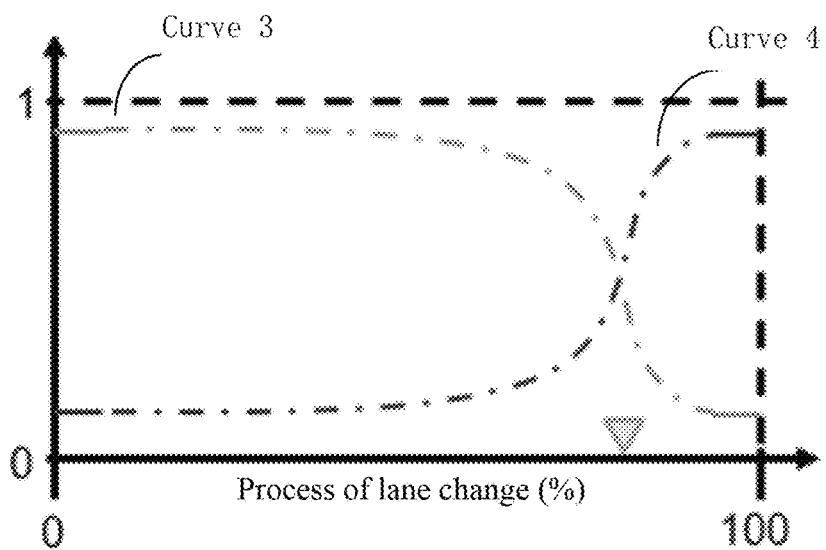
FIG. 3 is a schematic diagram of a second curve of collective weight and a second curve of adjacent weight provided by an embodiment of the present disclosure.

As shown in FIG. 3, it is a schematic diagram of a second curve of collective weight and a second curve of adjacent weight provided by the embodiment of the present disclosure. A realization scenario in FIG. 3 is that the preceding vehicle is decelerating when the host vehicle is changing lanes, a horizontal axis in FIG. 3 represents the process of lane changing, and a vertical axis in FIG. 3 represents the collective weight and/or the adjacent weight, a curve 3 in FIG. 3 is a curve of the collective weight, a curve 4 is a curve of the adjacent weight, because the preceding vehicle is decelerating, the first collision risk will be greater than the second collision risk, therefore, the collective weight will be greater than the adjacent weight during a long process of lane change (for example, refer to an area before an intersection point where the curve 3 and the curve 4 are intersected), the adjacent weight will not be greater than the collective weight until the target lane line is approached.

Figure 4:
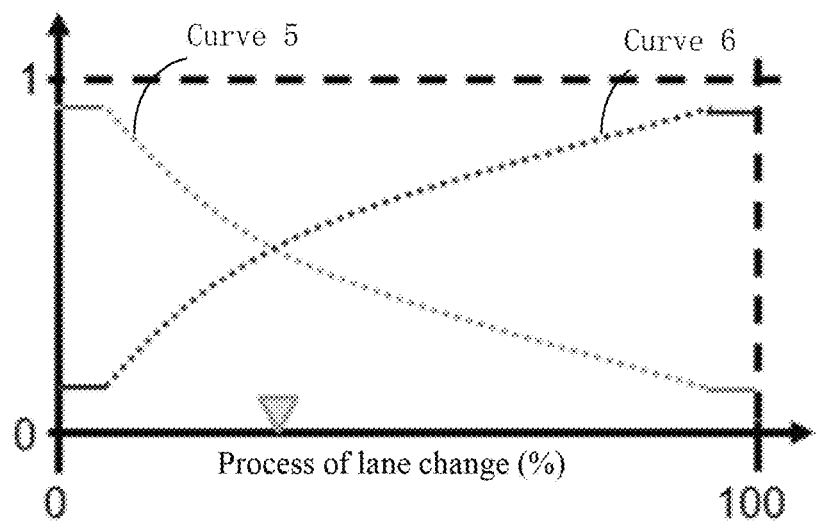
FIG. 4 is a schematic diagram of a third curve of collective weight and a third curve of adjacent weight provided by an embodiment of the present disclosure.

As shown in FIG. 4, it is a schematic diagram of a third curve of collective weight and a third curve of adjacent weight provided by the embodiment of the present disclosure. A realization scene of FIG. 4 is that when the host vehicle changes lanes, a distance between the preceding vehicle and the host vehicle is greater than a distance between the adjacent preceding vehicle and the host vehicle, and a horizontal axis in FIG. 4 represents the process of lane change, a vertical axis in FIG. 4 represents the collective weight and/or the adjacent weight, a curve 5 in FIG. 4 is a curve of the collective weight, and a curve 6 is a curve of the adjacent weight, since a distance between the preceding vehicle and the host vehicle is greater than a distance between the adjacent preceding vehicle and the host vehicle, the second collision risk will be greater than the first collision risk (for example, refer to an area before the intersection point where the curve 5 and the curve 6 intersect), therefore, the process of lane change with the collective weight greater than the adjacent weight will be shorter.

Block 107, the vehicle-mounted device controls the host vehicle to perform an operation of lane change based on the plurality of reference vehicle values, the lane-change weight, and the first vehicle data.

In at least one embodiment of the present disclosure, the controlling of the host vehicle to perform the operation of lane change based on the plurality of reference vehicle values, the lane-change weight, and the first vehicle data includes: calculating a vehicle-following time of the host vehicle based on a collision time between the host vehicle and the adjacent preceding vehicle, the lane-change weight, a preset time interval value, and a preset collision time; calculating a vehicle-vehicle-following distance according to the velocity of the host vehicle and the vehicle-following time; adjusting the first vehicle data according to the vehicle-following distance, a preset safety distance and the plurality of reference vehicle values, during the process of lane change; and controlling the host vehicle to change lanes according to the adjusted first vehicle data until the operation of lane change is completed.

Wherein, the preset collision time includes a first preset collision time and a second preset collision time, and the preset collision time can be set according to requirements, which is not limited in this disclosure. The preset time interval value includes a first time interval value and a second time interval value, wherein the second time interval value is a time interval value selected by the user from a plurality of initial time interval values provided by the host vehicle, the first time interval value is the smallest initial time interval value among the plurality of initial time interval values, and the preset time interval value can be set according to requirements, which is not limited in this disclosure.

Specifically, a formula of calculating an amount of reducing the vehicle-following time is:

$$T_{gapshrink} = (1 - K_{LC_{host}}) * \frac{TTC_{shrink_{thrld}}}{TTC_{next_{front}}} * (Tgap_{min} - Tgap_{set});$$

Wherein, $T_{gapshrink}$ represents the amount of reducing the vehicle-following time, $K_{LC_{host}}$ represents the lane-change weight, $Tgap_{min}$ represents the first time interval value, $Tgap_{set}$ represents the second time interval value, $TTC_{shrink_{thrld}}$ represents the preset collision time, $TTC_{next_{front}}$ represents the collision time between the host vehicle and the adjacent preceding vehicle, wherein a method of calculating $TTC_{next_{front}}$ is basically the same as the method of calculating the first collision time, so the present disclosure is not repeated here, the vehicle-following time is ($Tgap_{set}$−$T_{gapshrink}$).

Specifically, the vehicle-mounted device calculates a product of the vehicle-following time and the velocity of the host vehicle to obtain the vehicle-following distance.

Specifically, the adjusting of the first vehicle data according to the vehicle-following distance, the preset safety distance and the plurality of reference vehicle values, during the process of lane change includes: comparing the vehicle-following distance with the safety distance; if the vehicle-following distance is less than the safety distance, adjusting the safety distance to be the vehicle-following distance and obtaining an updated safety distance; when the reference vehicle distance is greater than the updated safety distance, increasing the velocity of the host vehicle and the acceleration of the host vehicle, and ensuring that the velocity of the host vehicle is the same as the reference vehicle velocity when the reference vehicle distance is the same as the updated safety distance; or when the reference vehicle distance is less than the updated safety distance, adjusting the velocity of the host vehicle and the acceleration of the host vehicle according to the reference vehicle velocity and the reference vehicle acceleration, and ensuring that the velocity of the host vehicle is the same as the reference vehicle velocity, and the acceleration of the host vehicle is the same as the reference vehicle acceleration when the reference vehicle distance is the same as the updated safety distance. Wherein, the adjusting includes increasing or decreasing.

In this embodiment, if the vehicle-following distance is smaller than the safety distance, by adjusting the safety distance to be the vehicle-following distance, the updated safety distance becomes smaller, and by adjusting the first vehicle data according to the updated safety distance, more time for adjustment can be reserved, thereby improving the comfort of the user during the process of lane change of the host vehicle.

In other embodiments of the present disclosure, if the vehicle-following distance is greater than or equal to the safety distance, the vehicle-following distance is compared with the reference vehicle distance.

According to the above recitation, in this disclosure, the second vehicle data of the preceding vehicle and the third vehicle data of the adjacent preceding vehicle can be obtained, since the preceding vehicle and the adjacent preceding vehicle can be fully considered, therefore, the safety of the host vehicle changing lanes can be improved. In addition, by selecting an adjacent vehicle with a relatively large distance from the host vehicle as the adjacent preceding vehicle, more time can be reserved for the host vehicle to adjust the velocity of the host vehicle, so as to improve the comfort of the user during the vehicle changes lanes, the risk weight of the preceding vehicle is calculated according to the first risk factor of the preceding vehicle and the second risk factor of the adjacent preceding vehicle, since the risk weight combines the first risk factor and the second risk factor, it is easier to analyze the preceding vehicle and the adjacent preceding vehicle on the lane change of the host vehicle, because the lane-change weight is inversely proportional to the process of lane change of the host vehicle, therefore, by calculating the lane-change weight, the completion of the process of lane change of the host vehicle can be accurately determined.

As shown in FIG. 5, it is a schematic structural diagram of a vehicle-mounted device according to one embodiment of the present disclosure.

In an embodiment of the present disclosure, the vehicle-mounted device 1 includes, but is not limited to, a storage device 12, a processor 13, and a computer program stored in the storage device 12 and can be executed by the processor 13. For example, the computer program can be a program of a lane change control.

Those skilled in the art can understand that the schematic structural diagram is only an example of the vehicle-mounted device 1, and does not constitute a limitation on the vehicle-mounted device 1, and may include more or less components than the one shown, or combine some components, or different components, for example, the vehicle-mounted device 1 may also include input and output devices, network access devices, buses, and the like.

The processor 13 may be a central processing unit (CPU), or other general-purpose processors, a digital signal processor (DSP), an application specific integrated circuit (ASIC), Field-Programmable Gate Array (FPGA) or other programmable logic devices, discrete gate or transistor logic devices, discrete hardware components, etc. The general-purpose processor can be a microprocessor or the processor can also be any conventional processor, etc. The processor 13 is the computing core and control center of the vehicle-mounted device 1, and uses various interfaces and lines to connect each part of the vehicle-mounted device 1.

The processor 13 obtains the operating system of the vehicle-mounted device 1 and obtains various installed applications. The processor 13 obtains the application program to implement each block in the embodiments of the foregoing lane change control method, for example, to implement each block shown in FIG. 1.

Exemplarily, the computer program can be divided into one or more modules/units, and the one or more modules/units are stored in the storage device 12 and retrieved by the processor 13 to complete the present disclosure. The one or more modules/units may be a series of computer program instruction segments capable of performing specific functions, and the instruction segments are used to describe the process of acquisition the computer program in the vehicle-mounted device 1.

The storage device 12 can be used to store the computer programs and/or modules, and the processor 13 executes or obtains the computer programs and/or modules stored in the storage device 12, and calls up the data stored in the storage device 12, such that various functions of the vehicle-mounted device 1 are realized. The storage device 12 may mainly include an area for storing programs and an area for storing data, wherein the area for storing programs may store an operating system, an application program required for at least one function (such as a sound playback function, an image playback function, etc.), and the like; the area for storing data may store the data created according to the use of the vehicle-mounted device 1. In addition, the storage device 12 may include non-volatile storage device such as hard disk, internal memory, plug-in hard disk, smart media card (SMC), Secure digital (SD) card, flash card, at least one disk storage device, flash memory device, or other non-volatile solid state storage device.

The storage device 12 may be an external storage device and/or an internal storage device of the vehicle-mounted device 1. Further, the storage device 12 may be a storage in physical form, such as a memory stick, a trans-flash card, and the like.

If the modules/units integrated in the vehicle-mounted device 1 are implemented in the form of software functional units and sold or used as independent products, they may be stored in a computer-readable storage medium. Based on this understanding, the present disclosure can implement all or part of the processes in the methods of the above embodiments, and can also be completed by instructing the relevant hardware through a computer program. The computer program can be stored in a computer-readable storage medium, and when the computer program is acquired by the processor, the blocks of the foregoing method embodiments can be implemented.

Wherein, the computer program includes computer program code, and the computer program code may be in the form of source code, object code, obtainable file or some intermediate form, and the like. The computer-readable medium may include: any entity or device capable of carrying the computer program code, recording medium, U disk, removable hard disk, magnetic disk, optical disk, computer memory, read-only memory (ROM).

With reference to FIG. 1, the storage device 12 in the vehicle-mounted device 1 stores a plurality of instructions, which when executed by the processor 13 cause the processor 13 to implement the lane change control method as shown in FIG. 1.

Specifically, for the specific implementation method of the above-mentioned instruction by the processor 13, reference may be made to the description of the relevant blocks in the corresponding embodiment of FIG. 1, and details are not described herein.

In the several embodiments provided in this disclosure, it should be understood that the devices and methods disclosed can be implemented by other means. For example, the device embodiments described above are only schematic. For example, the division of the modules is only a logical function division, which can be implemented in another way.

The modules described as separate parts may or may not be physically separate, and the parts displayed as modules may or may not be physical units, that is, may be located in one place, or may be distributed over multiple network units. Part or all of the modules can be selected according to the actual needs to achieve the purpose of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable a computing device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

The above description is only embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A lane change control method applied to a vehicle-mounted device, the vehicle-mounted device being configured in a host vehicle, the method comprising:
   obtaining first vehicle data, second vehicle data, and third vehicle data, wherein the first vehicle data is data of the host vehicle, the second vehicle data is data of a preceding vehicle in a same lane of the host vehicle, and the third vehicle data is data of an adjacent preceding vehicle in an adjacent lane of the host vehicle;
   calculating a first risk factor of the preceding vehicle based on the first vehicle data and the second vehicle data, and calculating a second risk factor of the adjacent preceding vehicle based on the first vehicle data and the third vehicle data;
   calculating a risk weight of the preceding vehicle according to the first risk factor and the second risk factor;
   calculating a lane-change weight based on a target lane line of the host vehicle;
   calculating a collective weight of the preceding vehicle according to the lane-change weight and the risk weight;
   calculating a plurality of reference vehicle values according to the collective weight, the second vehicle data and the third vehicle data; and
   controlling the host vehicle to perform an operation of lane change based on the plurality of reference vehicle values, the lane-change weight, and the first vehicle data.

2. The lane change control method according to claim 1, further comprising:
   acquiring external vehicle data of a plurality of external vehicles, wherein each external vehicle data comprises a position of each of the plurality of external vehicles;
   identifying first target vehicles and second target vehicles according to the position of the host vehicle in the first vehicle data and the position of each of the plurality of external vehicles, wherein the first target vehicles are vehicles in the same lane of the host vehicle, and the second target vehicles are vehicles in an adjacent lane of the host vehicle;
   determining a vehicle from the first target vehicles being located in front of the host vehicle and having a smallest distance from the host vehicle as the preceding vehicle;
   determining a vehicle from the second target vehicles being located in front of the host vehicle and having a smallest distance from the host vehicle as a first adjacent vehicle;
   determining a vehicle from the second target vehicles being located in front of the first adjacent vehicle and having a smallest distance from the first adjacent vehicle as a second adjacent vehicle;
   calculating a first collision time between the host vehicle and the first adjacent vehicle;
   determining the second adjacent vehicle as the adjacent preceding vehicle, when the first collision time is less than a first preset threshold value; and
   determining the first adjacent vehicle as the adjacent preceding vehicle when the first collision time is greater than or equal to the first preset threshold value.

3. The lane change control method according to claim 1, wherein the first vehicle data further comprises a velocity of the host vehicle, the third vehicle data further comprises a velocity of the adjacent preceding vehicle, the calculating of the second risk factor of the adjacent preceding vehicle based on the first vehicle data and the third vehicle data comprises:
   calculating a relative velocity between the host vehicle and the adjacent preceding vehicle according to the velocity of the host vehicle and the velocity of the adjacent preceding vehicle;
   calculating a second collision time according to a distance between the host vehicle and the adjacent preceding vehicle, and the relative velocity; and
   calculating the second risk factor based on the velocity of the host vehicle, the distance between the host vehicle and the adjacent preceding vehicle, the second collision time, and a second preset threshold value.

4. The lane change control method according to claim 3, wherein the controlling of the host vehicle to perform the operation of lane change based on the plurality of reference vehicle values, the lane-change weight, and the first vehicle data comprises:
calculating a vehicle-following time of the host vehicle based on a collision time between the host vehicle and the adjacent preceding vehicle, the lane-change weight, a preset time interval value, and a preset collision time;
calculating a vehicle-vehicle-following distance according to the velocity of the host vehicle and the vehicle-following time;
adjusting the first vehicle data according to the vehicle-following distance, a preset safety distance and the plurality of reference vehicle values, during a process of lane change, and controlling the host vehicle to change lanes according to the adjusted first vehicle data until the operation of lane change is completed.

5. The lane change control method according to claim 1, wherein the calculating of the risk weight of the preceding vehicle according to the first risk factor and the second risk factor comprises:
obtaining a sum of factors by adding the first risk factor to the second risk factor; and
obtaining the risk weight by calculating a ratio of the first risk factor to the sum of factors.

6. The lane change control method according to claim 1, wherein the calculating of the lane-change weight based on the target lane line of the host vehicle comprises:
obtaining offsets at a plurality of times, wherein an absolute value of each offset at each of the plurality of times is a lateral distance between the host vehicle and the target lane line;
comparing an offset at a first time to an offset at a second time, wherein the second time is later than the first time;
determining a value 1 as a target offset when the offset at the first time is less than or equal to the offset at the second time offset;
determining a ratio of the offset at the second time to the offset at the first time as the target offset when the offset at the first time is greater than the offset at the second time; and
determining the target offset as the lane-change weight.

7. The lane change control method according to claim 1, wherein the calculating of the lane-change weight based on the target lane line of the host vehicle further comprises:
calculating a risk factor of a rear vehicle;
obtaining offsets at a plurality of times, wherein each of the offsets at each of the plurality of times is a lateral distance between the host vehicle and the target lane line;
comparing an offset at a first time to an offset at a second time, wherein the second time is later than the first time;
when the offset at the first time is greater than the offset at the second time, determining a value 1 as a target offset;
when the offset at the first time is less than or equal to the offset at the second time, determining a ratio of the offset at the second time to the offset at the first time as a target offset;
obtaining a target weight by adding the target offset to the risk factor of the rear vehicle;
comparing the target weight with the value 1, and selecting a smaller value between the target weight and the value 1 as the lane-change weight.

8. The lane change control method according to claim 7, wherein the calculating of the risk factor of the rear vehicle comprises:
calculating a third collision time between the host vehicle and the rear vehicle;
calculating a first difference value between the third collision time and a third preset threshold value; and
calculating a second difference value between the third preset threshold value and a fourth preset threshold value;
calculating a ratio of the first difference value to the second difference value; and
obtaining the risk factor of the rear vehicle by subtracting the ratio of the first difference value to the second difference value from the value 1.

9. A vehicle-mounted device comprising:
a storage device;
at least one processor; and
the storage device storing one or more programs, which when executed by the at least one processor, cause the at least one processor to:
obtain first vehicle data, second vehicle data, and third vehicle data, wherein the first vehicle data is data of the host vehicle, the second vehicle data is data of a preceding vehicle in a same lane of the host vehicle, and the third vehicle data is data of an adjacent preceding vehicle in an adjacent lane of the host vehicle;
calculate a first risk factor of the preceding vehicle based on the first vehicle data and the second vehicle data, and calculate a second risk factor of the adjacent preceding vehicle based on the first vehicle data and the third vehicle data;
calculate a risk weight of the preceding vehicle according to the first risk factor and the second risk factor;
calculate a lane-change weight based on a target lane line of the host vehicle;
calculate a collective weight of the preceding vehicle according to the lane-change weight and the risk weight;
calculate a plurality of reference vehicle values according to the collective weight, the second vehicle data and the third vehicle data; and
control the host vehicle to perform an operation of lane change based on the plurality of reference vehicle values, the lane-change weight, and the first vehicle data.

10. The vehicle-mounted device according to claim 9, wherein the at least one processor is further caused to:
acquire external vehicle data of a plurality of external vehicles, wherein each external vehicle data comprises a position of each of the plurality of external vehicles;
identify first target vehicles and second target vehicles according to the position of the host vehicle in the first vehicle data and the position of each of the plurality of external vehicles, wherein the first target vehicles are vehicles in the same lane of the host vehicle, and the second target vehicles are vehicles in an adjacent lane of the host vehicle;
determine a vehicle from the first target vehicles being located in front of the host vehicle and having a smallest distance from the host vehicle as the preceding vehicle;
determine a vehicle from the second target vehicles being located in front of the host vehicle and having a smallest distance from the host vehicle as a first adjacent vehicle;

determine a vehicle from the second target vehicles being located in front of the first adjacent vehicle and having a smallest distance from the first adjacent vehicle as a second adjacent vehicle;

calculate a first collision time between the host vehicle and the first adjacent vehicle;

determine the second adjacent vehicle as the adjacent preceding vehicle, when the first collision time is less than a first preset threshold value; and determine the first adjacent vehicle as the adjacent preceding vehicle when the first collision time is greater than or equal to the first preset threshold value.

11. The vehicle-mounted device according to claim 9, wherein the first vehicle data further comprises a velocity of the host vehicle, the third vehicle data further comprises a velocity of the adjacent preceding vehicle, the at least one processor calculates the second risk factor of the adjacent preceding vehicle based on the first vehicle data and the third vehicle data by:

calculating a relative velocity between the host vehicle and the adjacent preceding vehicle according to the velocity of the host vehicle and the velocity of the adjacent preceding vehicle;

calculating a second collision time according to a distance between the host vehicle and the adjacent preceding vehicle, and the relative velocity; and calculating the second risk factor based on the velocity of the host vehicle, the distance between the host vehicle and the adjacent preceding vehicle, the second collision time, and a second preset threshold value.

12. The vehicle-mounted device according to claim 11, wherein the at least one processor controls the host vehicle to perform the operation of lane change based on the plurality of reference vehicle values, the lane-change weight, and the first vehicle data by:

calculating a vehicle-following time of the host vehicle based on a collision time between the host vehicle and the adjacent preceding vehicle, the lane-change weight, a preset time interval value, and a preset collision time;

calculating a vehicle-vehicle-following distance according to the velocity of the host vehicle and the vehicle-following time;

adjusting the first vehicle data according to the vehicle-following distance, a preset safety distance and the plurality of reference vehicle values, during a process of lane change, and controlling the host vehicle to change lanes according to the adjusted first vehicle data until the operation of lane change is completed.

13. The vehicle-mounted device according to claim 9, wherein the at least one processor calculates the risk weight of the preceding vehicle according to the first risk factor and the second risk factor by:

obtaining a sum of factors by adding the first risk factor to the second risk factor; and obtaining the risk weight by calculating a ratio of the first risk factor to the sum of factors.

14. The vehicle-mounted device according to claim 9, wherein the at least one processor calculates the lane-change weight based on the target lane line of the host vehicle by:

obtaining offsets at a plurality of times, wherein an absolute value of each offset at each of the plurality of times is a lateral distance between the host vehicle and the target lane line;

comparing an offset at a first time to an offset at a second time, wherein the second time is later than the first time;

determining a value 1 as a target offset when the offset at the first time is less than or equal to the offset at the second time offset;

determining a ratio of the offset at the second time to the offset at the first time as the target offset when the offset at the first time is greater than the offset at the second time; and determining the target offset as the lane-change weight.

15. The vehicle-mounted device according to claim 9, wherein the at least one processor calculates the lane-change weight based on the target lane line of the host vehicle by:

calculating a risk factor of a rear vehicle;

obtaining offsets at a plurality of times, wherein each of the offsets at each of the plurality of times is a lateral distance between the host vehicle and the target lane line;

comparing an offset at a first time to an offset at a second time, wherein the second time is later than the first time;

when the offset at the first time is greater than the offset at the second time, determining a value 1 as a target offset;

when the offset at the first time is less than or equal to the offset at the second time, determining a ratio of the offset at the second time to the offset at the first time as a target offset;

obtaining a target weight by adding the target offset to the risk factor of the rear vehicle;

comparing the target weight with the value 1, and selecting a smaller value between the target weight and the value 1 as the lane-change weight.

16. The vehicle-mounted device according to claim 15, wherein the at least one processor calculates the risk factor of the rear vehicle by:

calculating a third collision time between the host vehicle and the rear vehicle;

calculating a first difference value between the third collision time and a third preset threshold value; and calculating a second difference value between the third preset threshold value and a fourth preset threshold value;

calculating a ratio of the first difference value to the second difference value; and obtaining the risk factor of the rear vehicle by subtracting the ratio of the first difference value to the second difference value from the value 1.

17. A non-transitory storage medium having instructions stored thereon, when the instructions are executed by a processor of a vehicle-mounted device, the processor is caused to perform a lane change control method, wherein the method comprises:

obtaining first vehicle data, second vehicle data, and third vehicle data, wherein the first vehicle data is data of the host vehicle, the second vehicle data is data of a preceding vehicle in a same lane of the host vehicle, and the third vehicle data is data of an adjacent preceding vehicle in an adjacent lane of the host vehicle;

calculating a first risk factor of the preceding vehicle based on the first vehicle data and the second vehicle data, and calculating a second risk factor of the adjacent preceding vehicle based on the first vehicle data and the third vehicle data;

calculating a risk weight of the preceding vehicle according to the first risk factor and the second risk factor;

calculating a lane-change weight based on a target lane line of the host vehicle;

calculating a collective weight of the preceding vehicle according to the lane-change weight and the risk weight;

calculating a plurality of reference vehicle values according to the collective weight, the second vehicle data and the third vehicle data; and controlling the host vehicle to perform an operation of lane change based on the plurality of reference vehicle values, the lane-change weight, and the first vehicle data.

18. The non-transitory storage medium according to claim 17, wherein the method further comprises:

acquiring external vehicle data of a plurality of external vehicles, wherein each external vehicle data comprises a position of each of the plurality of external vehicles;

identifying first target vehicles and second target vehicles according to the position of the host vehicle in the first vehicle data and the position of each of the plurality of external vehicles, wherein the first target vehicles are vehicles in the same lane of the host vehicle, and the second target vehicles are vehicles in an adjacent lane of the host vehicle;

determining a vehicle from the first target vehicles being located in front of the host vehicle and having a smallest distance from the host vehicle as the preceding vehicle;

determining a vehicle from the second target vehicles being located in front of the host vehicle and having a smallest distance from the host vehicle as a first adjacent vehicle;

determining a vehicle from the second target vehicles being located in front of the first adjacent vehicle and having a smallest distance from the first adjacent vehicle as a second adjacent vehicle;

calculating a first collision time between the host vehicle and the first adjacent vehicle;

determining the second adjacent vehicle as the adjacent preceding vehicle, when the first collision time is less than a first preset threshold value; and determining the first adjacent vehicle as the adjacent preceding vehicle when the first collision time is greater than or equal to the first preset threshold value.

19. The non-transitory storage medium according to claim 17, wherein the first vehicle data further comprises a velocity of the host vehicle, the third vehicle data further comprises a velocity of the adjacent preceding vehicle, the calculating of the second risk factor of the adjacent preceding vehicle based on the first vehicle data and the third vehicle data comprises:

calculating a relative velocity between the host vehicle and the adjacent preceding vehicle according to the velocity of the host vehicle and the velocity of the adjacent preceding vehicle;

calculating a second collision time according to a distance between the host vehicle and the adjacent preceding vehicle, and the relative velocity; and calculating the second risk factor based on the velocity of the host vehicle, the distance between the host vehicle and the adjacent preceding vehicle, the second collision time, and a second preset threshold value.

20. The non-transitory storage medium according to claim 19, wherein the controlling of the host vehicle to perform the operation of lane change based on the plurality of reference vehicle values, the lane-change weight, and the first vehicle data comprises:

calculating a vehicle-following time of the host vehicle based on a collision time between the host vehicle and the adjacent preceding vehicle, the lane-change weight, a preset time interval value, and a preset collision time;

calculating a vehicle-vehicle-following distance according to the velocity of the host vehicle and the vehicle-following time;

adjusting the first vehicle data according to the vehicle-following distance, a preset safety distance and the plurality of reference vehicle values, during a process of lane change, and controlling the host vehicle to change lanes according to the adjusted first vehicle data until the operation of lane change is completed.

* * * * *